J. P. TOSTEVIN.
Grain Winnower.

No. 93,926. Patented Aug. 17, 1869.

Witnesses:
H. Bruns
James Lang

Inventor:
James P. Tostevin
by Coburn & Kean

United States Patent Office.

JAMES P. TOSTEVIN, OF RACINE, WISCONSIN, ASSIGNOR TO HIMSELF AND JOHN H. TENSPOLDE, OF SAME PLACE.

Letters Patent No. 93,926, dated August 17, 1869.

---

IMPROVEMENT IN GRAIN-SEPARATORS.

---

The Schedule referred to in these Letters Patent and making part of the same.

---

*To all whom it may concern:*

Be it known that I, JAMES P. TOSTEVIN, of Racine, in the county of Racine, and State of Wisconsin, have invented a new and useful Improvement in Grain-Separators; and I do hereby declare and make known that the following is a full, clear, and exact description of the same, reference being had to the accompanying drawings, and the letters and figures marked thereon, which form part of this specification.

My said improvement relates to that class of separators in which a fan or blower is used to separate and remove the chaff from the grain, the grain being passed through and over suitable sieves or screens, so as to be delivered from the machine clean, and free from all chaff or other impurities; and My invention consists in several specific improvements, hereinafter particularly set forth, whereby the separator is made better, and more desirable, with respect to said improved features, as hereinafter specified.

To enable those skilled in the art to understand how to construct and use my said improvement, I will now proceed to describe the same in detail, making reference, in so doing, to the aforesaid drawings, in which—

Similar letters of reference, in the several figures, denote the same parts of my improvement.

One feature of my improvement consists in a novel mode of constructing one of the boxes which support the crank-shaft, whereby said shaft may be secured effectually from any longitudinal displacement or movement, and the pin which secures said shaft is effectually prevented from becoming loose, and dropping out.

Figure 1:
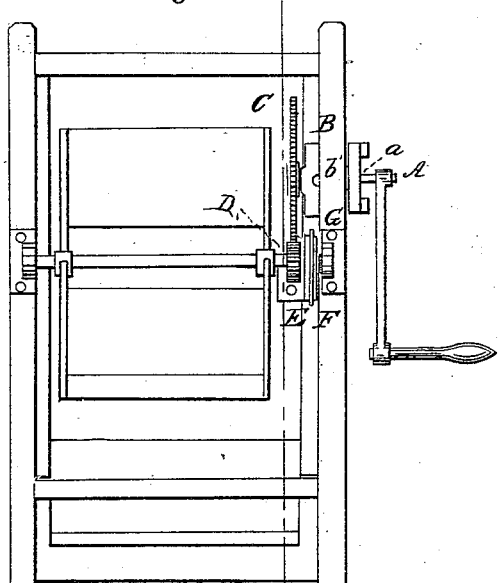
Figure 1 is an end sectional view, the drum enclosing the fan being removed, as indicated by the line $x$ in fig. 2.

The crank-shaft $a$ is supported in two boxes A B, which are bolted together, one upon each side of the upright post of the frame, as clearly shown in fig. 1.

Figure 3:
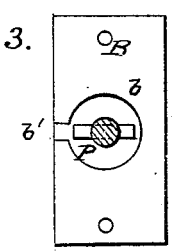
Figures 3 and 4 are, respectively, a view of the inner face of the plate, and a vertical section of the same.

In fig. 3 is shown the face of one of said boxes, B, which is clamped against the frame, a hollow being formed around the hole, in which the crank-shaft turns, as indicated at $b$, into which opening $b$ an inlet, $b'$, is made, for the purpose of inserting the pin $p$, which secures the crank-shaft.

Figure 4:
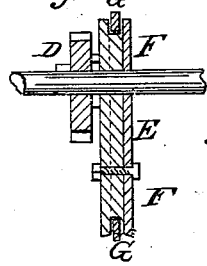

Thus, when the pin is inserted through the passage $b'$, it passes through a hole in the crank-shaft, and lies wholly within the hollow or basin $b$, as indicated in figs. 3 and 4, so that the pin revolves with the shaft in the circular recess $b$ in the box, which is made just deep enough to provide for the thickness of the pin $p$, and permit it to turn freely, at the same time preventing any longitudinal movement in the crank-shaft, as desired.

The revolution of the crank-shaft and its gear-wheel C, engaging with the pinion D upon the fan-shaft, revolves said fan-shaft, and, by means of the eccentric thereon, operates or shakes the separating-shoe.

Another feature of my improvement consists in the mode of constructing the eccentric on the fan-shaft, and of connecting the pitman therewith.

Figures 5, 6:
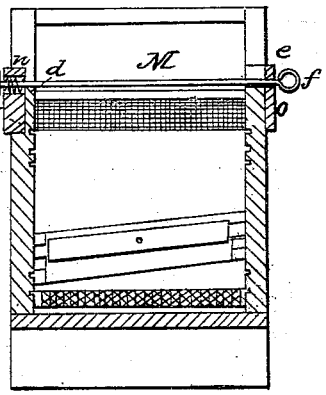
Figure 5 represents a section parallel with the shaft, taken through the eccentric for propelling the shoe.
Figure 6 represents a vertical section, taken across the rear end of the shoe, to show the device for holding the sides thereof firmly together.

The eccentric consists of two plates, one, E, having a shoulder, as shown in fig. 5, to receive the collar or strap G, which surrounds the eccentric, and is connected with the pitman, so that the revolution of the eccentric will impart a longitudinal movement to said pitman.

The other plate constituting said eccentric, marked F, is removably secured to the plate E, by a bolt or otherwise, as shown, so that when the plate F is attached, the collar or strap G is secured upon the eccentric; but when the plate F is detached, the collar can readily be removed, as desired.

Another feature of my invention consists in a novel mode of connecting the pitman to the collar or strap used in connection with said eccentric, whereby said pitman can be lengthened or shortened, at pleasure, when desired. This feature is shown in fig. 2, where I represents the pitman, $s$, a screw upon the end thereof, and H, a lip or plate attached to the collar G, having in it a female screw, to receive the screw $s$ on the pitman, so that by detaching the opposite end of the pitman from the elbow, and revolving said pitman in either direction, it will be lengthened or shortened, as desired.

Figure 2:
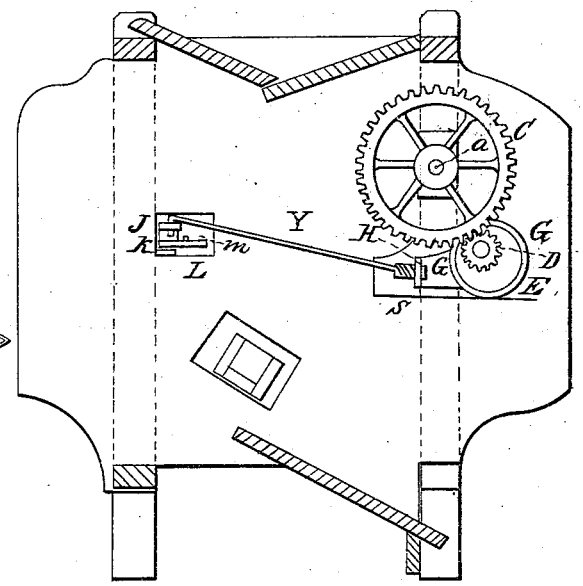
Figure 2 is a side sectional view, taken at the line $x$ in fig. 1.

Another feature of my improvement consists in constructing the elbow, by means of which the pitman imparts a shaking motion to the shoe, with a vertical member, so that the two arms J and L shall not lie in the same horizontal plane, but one above the other, the two being connected by a vertical bar, K, as shown in fig. 2.

The rod which connects the shoe to the elbow $m$ must be attached to the arm L, lying longitudinally with respect to the machine, and the pitman must be attached to the arm at right angles therewith, necessitating the crossing of the pitman and the rod $m$, which can only be done when the elbow is constructed with the vertical part K.

Another feature of my improvement consists in the employment of a spring and a spring-case in connection with a stay-rod, passing across the shoe from side to side, to stiffen and strengthen the shoe, which device is illustrated in fig. 6.

M represents a rod, having a head, $c$, said rod, near its head, being provided with a coil-spring, marked $d$, which fits into a case or recess, $n$, in a metallic plate or block upon one side of the shoe, marked N, one end of said coil-spring resting against the head of the rod $c$, and the bottom of recess or case $n$.

The opposite end of the rod is raised up or placed down in a vertical slot, $e$, made in the top of the shoe, and in a bearing-plate, O, also, as shown, being provided with a set or stationary ring or loop, $f$, so that by turning the rod until the ring lies across the slot $e$, the rod is secured from drawing lengthwise through the slot, the spring $d$ being kept in place by the case $n$, and serving, in connection with the rod M, to give a firm, steady, yet yielding stay or support to the sides of the shoe, as desired.

Figure 7:
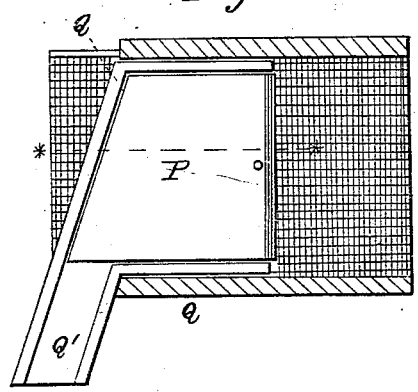
Figure 7 represents a top view of one of the screens of the shoe, with a plate covering the same.

In fig. 7 is shown a horizontal section of the shoe, showing a plan view of a screen, Q, and its chute or discharge Q′, which is generally used and known as the No. 1 screen, or the screen which carries the grade of wheat known as No. 1 out of the separator.

Figure 8:
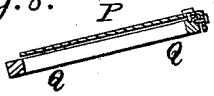
Figure 8 represents a vertical section through said screen and plate, at the line $x$ in fig. 7.

In said fig. 7, and also in fig. 8, which is a section at the line $x$ in fig. 7, a plate, P, of the same configuration as the screen, is represented as covering said screen, this plate being attached in such a way as to be removable at pleasure.

This removable plate P, as applied and used, in connection with said screen Q, in the manner specified, for the purpose of adapting the machine to the cleaning of grass-seed, which can thus fall upon said plate P, and pass down out at the spout Q, is another feature of my improvement.

The remaining parts of the machine may be constructed in any of the known ways, and my invention does not extend to other parts than those hereinbefore specifically mentioned.

Having described the construction and operation of my improvement, I will now specify what I claim, and desire to secure by Letters Patent:

1. I claim constructing one of the boxes of the crank-shaft with a circular recess, $b$, or its equivalent, when provided with a groove, $b'$, to introduce a pin, $p$, substantially as herein set forth, and for the purposes specified.

2. I claim constructing the eccentric on the fan-shaft of the two plates E and F, one having a shoulder, to receive the strap G, and the other being removable, as desired, in the manner and for the purposes specified.

3. I claim securing the pitman I to the flange H upon the strap G, by means of a screw, $s$, substantially as shown, and for the purposes set forth.

4. I claim constructing the shaking-elbow J L with a vertical connecting arm, K, as and for the purposes described and specified.

5. I claim the combination of the rod M, the socket $n$, and spring $d$, with the sides of the shoe, in the manner and for the purposes described.

6. I claim the combination of the imperforated plate P with the screen Q, as and for the purposes specified and set forth.

JAMES P. TOSTEVIN.

Witnesses:
W. E. MARRS,
H. BRUNS.